(12) United States Patent
Khayrallah et al.

(10) Patent No.: US 7,586,974 B2
(45) Date of Patent: Sep. 8, 2009

(54) METHOD AND APPARATUS FOR RAKE FINGER ALLOCATION IN A DS-CDMA RECEIVER

(75) Inventors: Ali S. Khayrallah, Apex, NC (US);
Gregory E. Bottomley, Cary, NC (US);
Håkan B. Eriksson, Täby (SE);
Carmela Cozzo, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 671 days.

(21) Appl. No.: 10/968,228

(22) Filed: Oct. 19, 2004

(65) Prior Publication Data

US 2006/0083292 A1    Apr. 20, 2006

(51) Int. Cl.
*H04B 1/00* (2006.01)
(52) U.S. Cl. ...................... 375/142; 375/140
(58) Field of Classification Search ......... 375/140–144, 375/343, E1.001, E1.002, E2.02, 147–153, 375/354, 362, 371, 374–376, 130, 136–137; 331/1 A, 25; 329/304, 306–307, 315, 323, 329/325

See application file for complete search history.

(56) References Cited

U.S. PATENT DOCUMENTS

| | | | |
|---|---|---|---|
| 6,658,045 | B1 | 12/2003 | Jin |
| 2002/0140603 | A1 | 10/2002 | Jeschke |
| 2002/0181599 | A1 | 12/2002 | Choi et al. |
| 2003/0095531 | A1* | 5/2003 | Soerensen et al. ......... 370/342 |
| 2004/0097204 | A1* | 5/2004 | Jung et al. ............... 455/132 |
| 2004/0139466 | A1* | 7/2004 | Sharma et al. ............. 725/72 |
| 2004/0179578 | A1 | 9/2004 | Ben Rached et al. |
| 2005/0111407 | A1* | 5/2005 | Hosein et al. ............. 370/329 |
| 2005/0111526 | A1 | 5/2005 | Bilgic et al. |

FOREIGN PATENT DOCUMENTS

| | | |
|---|---|---|
| EP | 0 821 495 A2 | 1/1998 |
| EP | 1 028 540 A2 | 8/2000 |
| EP | 1 372 269 A1 | 12/2003 |
| EP | 1 376 887 A1 | 1/2004 |
| JP | 01189680 A | 7/1989 |
| JP | 2002009663 A | 1/2002 |
| WO | WO 03/069790 A2 | 8/2003 |

OTHER PUBLICATIONS

Jurgen Becker, et al., "An Application-tailored Dynamically Reconfigurable Hardware Architecture for Digital Baseband Processing," IEEE, 2000.
Chen, et al, "A Memory Direction Descent Search Near Optimum Multiuser Detection for DS/CDMA Communications," Spread Spectrum Techniques and Applications, 2000 IEEE Sixth International Symposium on Sep. 6, 2000-Sep. 8, 2000, Parsippany, NJ, USA, publ. 2000, vol. 2, pp. 705-707.

* cited by examiner

*Primary Examiner*—Shuwang Liu
*Assistant Examiner*—James M Perez (57) ABSTRACT

A Direct-Sequence Code Division Multiple Access (DS-CDMA) receiver and method of allocating probing correlators and combining correlators (fingers). A front-end processor converts received radio signals to baseband samples. Based on average path strengths, a controller adaptively allocates probing correlators to signal paths to de-spread certain received signals. Based on path power estimates, the controller adaptively allocates combining correlators to signal paths. The allocations may be made to minimize the total received power at the receiver, or to achieve acceptable performance for all users.

26 Claims, 7 Drawing Sheets

METHOD AND APPARATUS FOR RAKE FINGER ALLOCATION IN A DS-CDMA RECEIVER

BACKGROUND

The present invention relates to communication systems. More particularly, and not by way of limitation, the present invention is directed to a method and apparatus for allocating Rake fingers in a Direct-Sequence Code Division Multiple Access (DS-CDMA) receiver.

Direct-Sequence Code Division Multiple Access (DS-CDMA) is used in second and third generation digital cellular systems such as WCDMA, cdma2000, and IS-95. DS-CDMA is also used in certain Wireless Local Area Network (WLAN) systems. Base stations utilizing DS-CDMA experience an important resource allocation problem. The base station receives signals from many different users, and demodulation resources must be assigned to recover these signals. Traditionally, demodulation is performed by a Rake receiver, in which Rake fingers are allocated to different delayed images of the signal. These different images arise from the multipath propagation environment. Capturing as much signal energy as possible is important for several reasons. First, it lowers the required transmission power level of signals from users in the coverage area. This enables a user to transmit at a lower power, thus saving battery life. It also enables the base station to adequately receive signals from a user located at the outer edge of the coverage area when transmitting at maximum power. In addition, by lowering the required transmission power level, less interference is generated to other users. This allows more users to co-exist, increasing capacity.

While the description herein focuses on the base station and multiple users, a similar situation occurs at the mobile receiver and multiple links in the downlink. The mobile station must monitor various communication links from one or more base stations, allocating fingers to paths corresponding to these different signals. Thus, the terms "user" and "link" are used interchangeably in the description herein.

The standard approach to Rake finger allocation is to give each user a fixed number of Rake fingers. For example, the CSM2000™ base station chip provided by Qualcomm gives each uplink user four Rake fingers. However, allocating each user a fixed number of Rake fingers is not always efficient. One user may not use all the Rake fingers available to it, while another user could benefit from additional Rake fingers. Also, it may be more important to allocate more Rake fingers to certain users to keep the overall received power low.

It would be advantageous to have a method and apparatus for allocating Rake fingers that solves the shortcomings of existing methodologies. The present invention provides such a method and apparatus.

SUMMARY

In one aspect, the present invention is directed to a radio receiver that includes a front end processor that converts received radio signals to baseband samples; a pool of correlators; and a controller. The controller includes means for partitioning the correlators into a set of combining correlators and a set of probing correlators that de-spread the baseband samples. The controller also includes an allocation unit that allocates probing correlators from the set of probing correlators to de-spread certain received signals, and allocates combining correlators from the set of combining correlators to achieve performance goals for each signal. The performance goals may include minimizing the total receive power at the receiver.

In another aspect, the present invention is directed to a method of allocating Rake fingers in a Direct-Sequence Code Division Multiple Access (DS-CDMA) receiver having a number of Rake fingers for processing signal paths of a number of users. The method includes the steps of determining an initial correlator allocation; and calculating an allocation ratio for each user based on the initial correlator allocation. The allocation ratio depends on a signal-to-interference ratio (SIR) value and a fraction of the power collected. The method also includes selecting at least one user based on the allocation ratio; and for the at least one selected user, computing a new correlator allocation and a new allocation ratio. The method may also repeat the selecting and computing steps until the correlator allocation utilizes a predefined number of correlators in the receiver.

In yet another aspect, the present invention is directed to a method of allocating correlators in a DS-CDMA receiver having a set of correlators for processing signal paths of a number of users. The method includes the steps of a) dividing the set of correlators among the users, thereby assigning each user a subset of correlators; b) partitioning the subset of correlators assigned to each user into probing correlators and combining correlators; c) assigning probing correlators to signal paths; and d) assigning combining correlators to signal paths. Steps b) and c) may be repeated, for example, at the rate at which paths appear and disappear, and step d) may be repeated at the rate fading channel coefficients change.

In still yet another aspect, the present invention is directed to a method of allocating correlators in a DS-CDMA receiver having a set of correlators for processing signal paths of a number of users. The method includes the steps of a) dividing the set of correlators into a first subset of probing correlators and a second subset of combining correlators, wherein the number of probing correlators is greater than the number of combining correlators; b) dividing the first subset of probing correlators among the users; and c) dividing the second subset of combining correlators among the users. Step a) may be repeated, for example, at the rate users appear and disappear; step b) may be repeated at the rate at which paths appear and disappear; and step c) may be repeated at the rate fading channel coefficients change.

In still yet another aspect, the present invention is directed to a controller in a DS-CDMA radio receiver. The controller includes means for adaptively allocating probing correlators to signal paths; and means for adaptively allocating combining correlators to signal paths.

In still yet another aspect, the present invention is directed to a method of allocating combining fingers in a DS-CDMA receiver having a number of correlators for processing signal paths of a number of users. The method includes the steps of computing an initial finger allocation; computing a direction of descent using the initial finger allocation; and computing a second finger allocation using the initial finger allocation and the direction of descent. The method may also include the steps of computing a second direction of descent using the second finger allocation; and computing a third finger allocation using the second finger allocation and the second direction of descent.

BRIEF DESCRIPTION OF THE SEVERAL VIEWS OF THE DRAWINGS

In the following section, the invention will be described with reference to exemplary embodiments illustrated in the figures, in which.

DETAILED DESCRIPTION

In accordance with the teachings of the present invention, an improved method and apparatus for sharing demodulation resources between users is provided. Various strategies are utilized to improve coverage or increase capacity (i.e., increase the number of users that can be served or increase the data rate for a given user).

Figure 1:
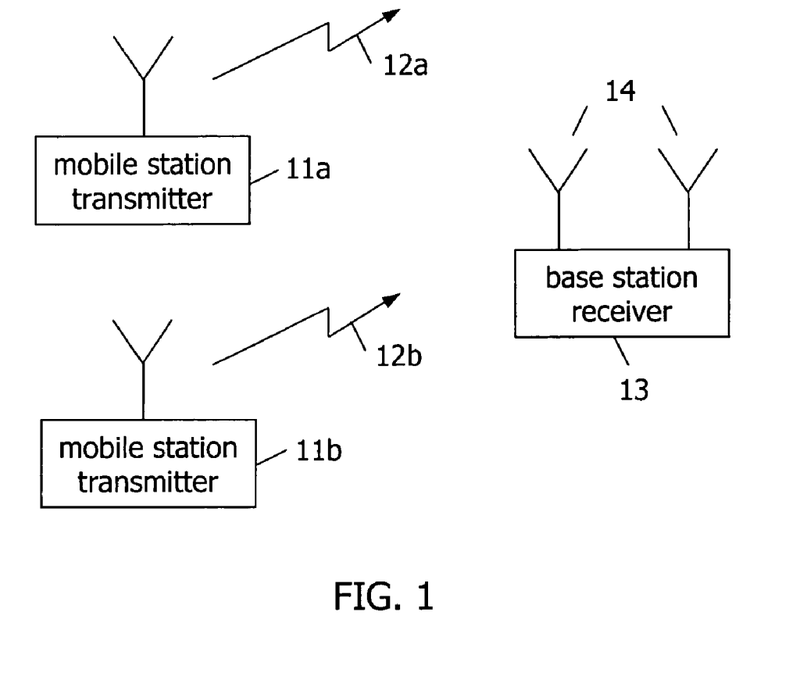
FIG. 1 is a simplified diagram of a DS-CDMA communication system suitable for incorporating the present invention.

FIG. 1 is a simplified diagram of a DS-CDMA communication system suitable for incorporating the present invention. Mobile station (MS) transmitters 11a and 11b send RF signals 12a and 12b to a base station receiver 13. The base station can have one, two, or more receive antennas 14.

Figure 2:
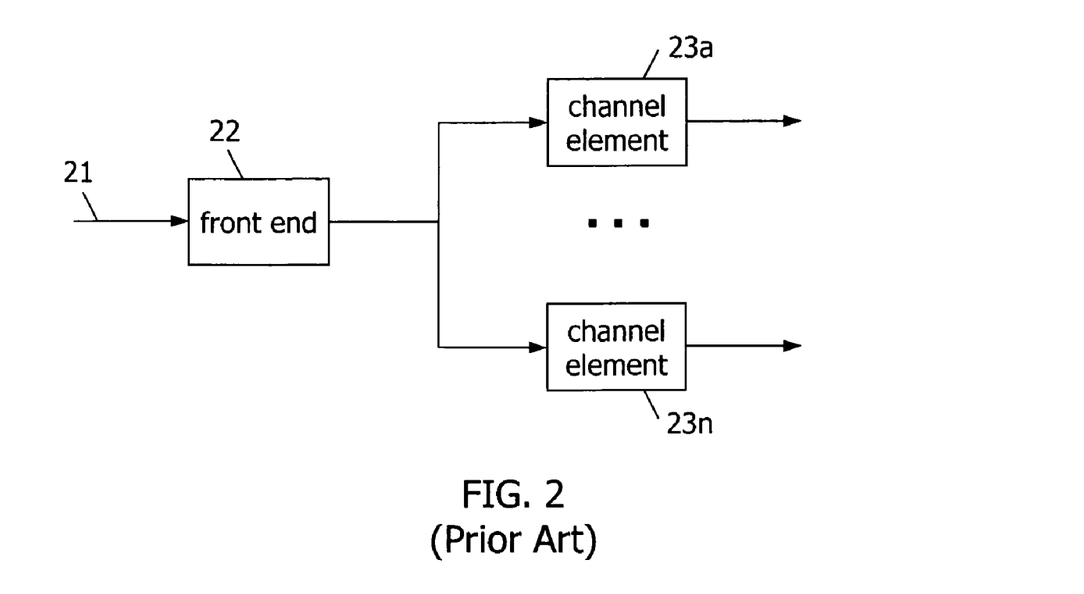
FIG. 2 (Prior Art) is a simplified block diagram of a conventional base station receiver.

FIG. 2 is a simplified block diagram of a conventional base station receiver. Received antenna signals 21 are converted to baseband samples using a front end 22, which typically amplifies, filters, and mixes the signal down to baseband. The signal is then provided to multiple channel elements 23a through 23n. Each channel element demodulates the signal from a single user. Each channel element includes Rake fingers, which de-spread different images of the received signal. These de-spread values are combined to form symbol estimates. Though not shown, these symbol estimates are typically processed further, using error-correction decoding followed by conversion to a format convenient to the user (for example, speech or a displayed web page).

Figure 3:
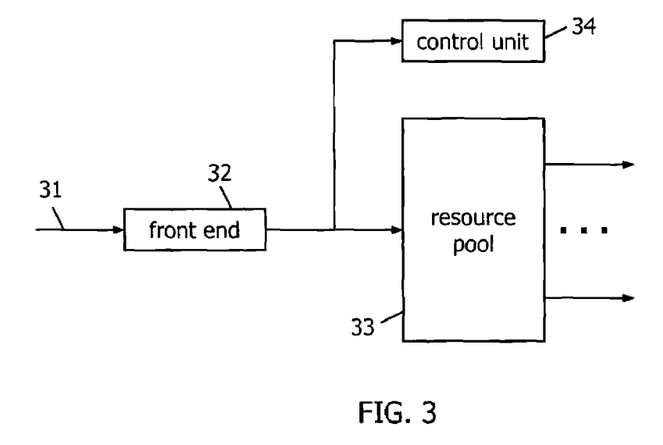
FIG. 3 is a simplified block diagram of a base station receiver according to an exemplary embodiment of the present invention.

FIG. 3 is a simplified block diagram of a base station receiver according to an exemplary embodiment of the present invention. Received antenna signals 31 are converted to baseband samples using a front end 32, which amplifies, filters, and mixes the signal down to baseband. These baseband signals are then provided to a resource pool 33, which contains demodulation resources such as Rake fingers or correlators, channel trackers, and possibly other resources. A control unit 34 determines which resources are used to demodulate a particular user signal. Though not shown, the symbol estimates are processed further, using error correction decoding followed by conversion to a format convenient to the user.

Throughout this description, the terms "finger" and "correlator" are used interchangeably. A Rake finger typically de-spreads a complex baseband sample stream by correlating to a complex spreading sequence to produce a real or complex de-spread value. Additionally, it should be noted that each finger need not correspond to a physical finger. For example, a correlation coprocessor may be run at a high rate so that multiple correlations can be performed in the time needed for a physical correlator to produce one correlation. This case is treated as having multiple fingers. Correlations can also be performed in software, requiring computing resources such as MIPs in a DSP. In this case, the number of fingers available may correspond to a MIPs budget for correlation.

Throughout this description, multiple antennas are treated as simply sources of more paths. For example, two receive antennas with two paths each are treated as a received signal with four paths.

Figure 4:
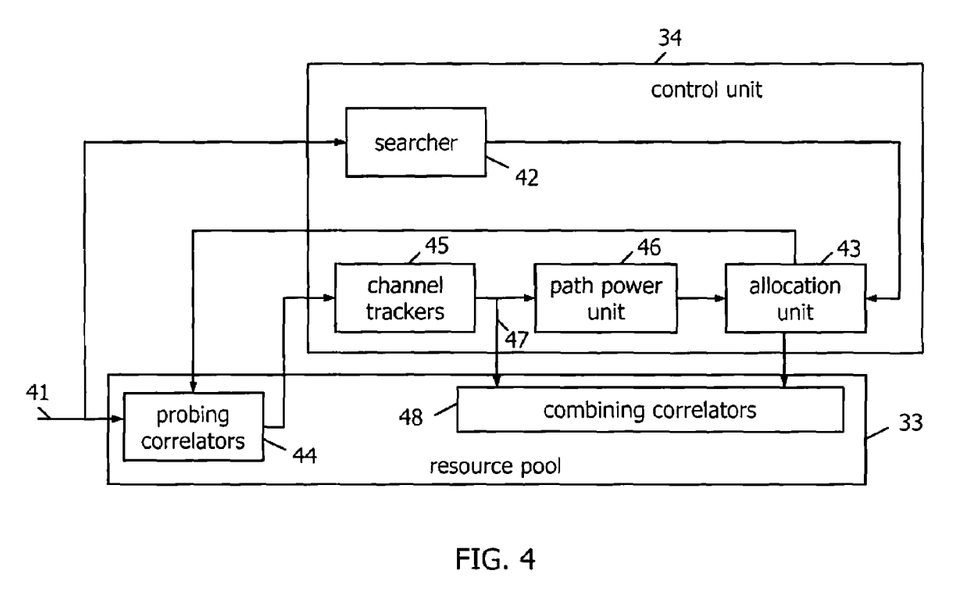
FIG. 4 is a simplified functional block diagram of an exemplary embodiment of a control unit in the base station receiver of the present invention.

FIG. 4 is a simplified functional block diagram of an exemplary embodiment of the control unit 34, which allocates resources from the resource pool 33 to different user signals. The received samples 41 are provided to a searcher 42, which performs conventional path searching to find the path delays and average path strengths for each user. This information is provided to an allocation unit 43. The allocation unit assigns probing correlators 44 or fingers in the resource pool 33 to each user. The probing correlators de-spread the pilot/control channel on the strongest paths based on the average path strengths. The probing correlators provide channel trackers 45 with pilot/control de-spread values which are used for channel estimation on the different paths. This allows the channel trackers to track the instantaneous fading values of the different paths. These channel estimates are provided to the path power unit 46 to determine instantaneous path powers for each path. The path power unit may simply take the magnitude-square of the channel estimate. It may also use a form of channel prediction to predict the path power at a future time. The channel estimates are also provided at 47 to combining correlators 48 or fingers in the resource pool 33 to form combining weights for Rake combining. These estimates may be delayed or refined further for demodulation.

The path power unit 46 provides the path powers to the allocation unit 43. The allocation unit uses the path powers to allocate combining fingers to each user by controlling the resource pool 33, which contains combining finger resources. For a given user, the allocation unit selects delays from the set of probing finger delays assigned to that user. For example, a user may have four probing fingers assigned to four of its paths. Combining fingers may be assigned to three of these paths, based on the path power estimates. Thus, the allocation unit performs two functions: allocating probing fingers and allocating combining fingers. These functions are discussed in more detail below.

Figure 4A:
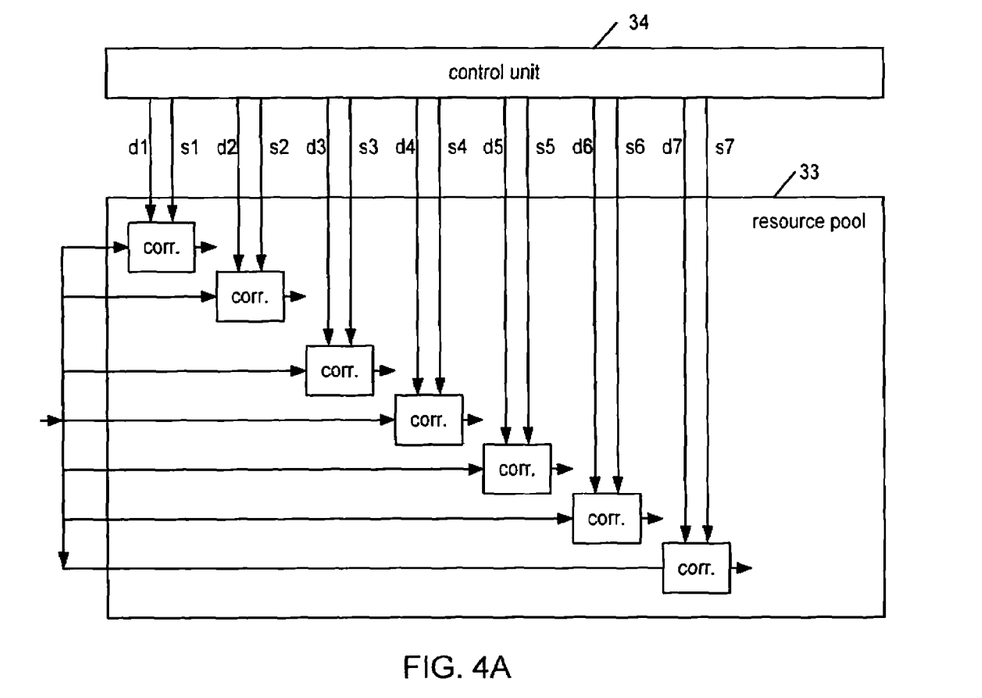
FIG. 4A is a simplified functional block diagram of an exemplary embodiment of the resource unit, which provides correlators or fingers that serve as probing or combining fingers for different users.

FIG. 4A is a simplified functional block diagram of an exemplary embodiment of the resource unit 33, which provides correlators or fingers that serve as probing or combining fingers for different users. In this example, there are seven correlators. The control unit 34 sends the first correlator a delay d1 and a spreading sequence s1 (corresponding to a particular user). The first correlator then despreads the received signal at delay d1 using spreading sequence s1. Similar operation occurs for the remaining 6 correlators.

A simple example may involve two users. In this example, user A has three paths with delays tA1, tA2, and tA3, and user B has two paths with delays tB1 and tB2. The control unit 34 allocates a certain number of correlators to probing. In this example, the control unit allocates four fingers to probing, three fingers to user 1 (covering all paths) and one finger to user 2 (covering only the strongest path, say tB2). As a result, d1=tA1, d2=tA2, d3=tA3, and d4=tB2. The corresponding spreading codes would be the pilot codes of the users. As a result, s1=s2=s3=pilot code of user A, and s4=pilot code of user B. If the control unit decides to combine paths tA2 and tA3 for user A and tB2 for user B, then d5=tA2, d6=tA3, and d7=tB2. Also, s5=s6=traffic code for user A, and s7=traffic code for user B. Later, the control unit may decide to combine paths tA1 and tA2 for user A. In this case the result would change to d6=tA1.

In general, the allocation problem is to determine how to utilize Q correlators or fingers. Each finger may be allocated as a probing correlator, monitoring the fading on a path, or it may be allocated as a combining correlator, de-spreading traffic data for demodulation. In addition, it must be determined which user will use each correlator. Two approaches are described for solving this problem. The first approach, referred to as the "user-first approach", includes two operations. The first operation is referred to as generic finger allocation. First, the set of Q correlators is divided among the users, allocating $q_i$ correlators to user i. The second operation is referred to as local finger partitioning and assignment. For each user, the correlators assigned to that user are partitioned into probing and combining correlators and assigned to paths. There are three steps in this operation: (a) partitioning fingers into probing and combining fingers; (b) assigning probing fingers to paths; and (c) assigning combining fingers to paths.

The first and second operations are repeated at some rate, which may depend upon a slow rate (the rate at which paths appear and disappear or the rate at which users appear and disappear). Steps (a) and (b) of the second operation can also be performed at a slow rate (the rate at which paths appear and disappear) while step (c) can be performed at a faster rate (the rate the fading channel coefficients change).

The second approach, referred to as the "correlator-first approach", includes three operations. The first operation is referred to as global finger partitioning. In this operation, the set of Q correlators is divided into two sets, E probing fingers and F combining fingers (E+F=Q). The second operation is referred to as probing finger allocation. In this operation, the E probing fingers are divided among the users. For a given user, the probing fingers are assigned to the strongest (on average) paths based on average path strengths provided by the searcher 42. The third operation is referred to as combining finger allocation. In this operation, the F combining fingers are divided among the users. The first operation can be performed at a slow rate, perhaps the rate users appear and disappear or the rates paths appear and disappear. The second operation can also be performed at a slow rate such as the rate paths appear and disappear. The third operation can be performed at a fast rate such as the rate the fading changes. The operations for the user-first approach and the correlator-first approach are discussed in more detail below.

Generic Finger Allocation

In generic finger allocation, the Q fingers are divided among the users, allocating $q_i$ fingers to each user. In one embodiment, a fixed allocation is used. For example, if the receiver is dimensioned to handle a maximum of 16 users with Q=160 fingers, each user may be allocated 10 fingers. In the prior art, five of these fingers would be probing fingers, and five of the fingers would be combining fingers. The five probing fingers would provide channel estimates to the five combining fingers for Rake combining. In the present invention, the partitioning for each user is adaptive, as discussed below.

A simple extension to the fixed allocation approach is to divide the fingers evenly among users present. Thus, if there are only 8 users for the receiver above, each user is allocated 20 fingers. If a new user is added, then some users would get 18 fingers, while some users would get 19 fingers. This is achieved by taking two fingers from some users and 1 finger from others. Thus, the allocation is adaptive to the number of users present.

In another embodiment, generic finger allocation is adapted based on the dispersion level for each user. For example, fingers may be divided up in proportion to the number of paths a user has. Users with more paths are allocated more fingers.

Another allocation criterion is based on average energy collection, which is related to the number of paths, but also accounts for how strong the paths are. For example, fingers may be assigned two at a time and considered as covering one path (probing+combining). Initially, each user is given one pair of correlators to cover the user's strongest path, based on average strength from the searcher 42. Next, pairs are given one at a time to the user whose fraction of average energy collected is smallest. This procedure continues until the correlators are all allocated. If the number of correlators is odd, the last "pair" will have only one finger.

Local Correlator Partitioning and Assignment

In general, the base station can decide for each user how to use the assigned fingers depending on the delay spread, the path strengths, the Doppler spread of the channel, the data rate, and the like. For example, Z fingers may be assigned as combining fingers and the remaining fingers may be assigned as probing fingers. The probing fingers are assigned to the strongest paths based on average strength. The combining fingers are adaptively assigned based on instantaneous path strengths. The value of Z is adaptive. For example, Z may be chosen so that the Z largest average path strengths collect at least 80% of the average path energy. If this is not possible, then the correlators are simply evenly divided into probing and combining and assigned to the strongest (on average) paths.

A good value for Z may also be learned by monitoring the fraction of the probed instantaneous energy that is being collected. If not enough energy is being collected, based on a threshold test, then the probing finger assigned to the weakest path can be changed to a combining finger. If delay spread increases over time, partitioning can be performed again. Also, the user can change a finger from probing to combining at a different rate than the rate at which the total available number of fingers changes.

The discussion above has described fast combining finger allocation in which combining fingers are allocated to paths at the fading rate or rate of power control. However, combining finger allocation can also operate at a much slower rate to reduce complexity. Specifically, combining fingers may be allocated at a rate close to the rate at which paths appear and disappear. If so, there may be the same number of probing and combining fingers, with a pair of such fingers being assigned to paths with the strongest average strength. Thus, as the searcher 42 learns which paths are strongest, the fingers move accordingly.

Global Finger Partitioning

With the correlator-first approach, the pool of Q correlators are divided into E probing fingers and F combining fingers. In one embodiment, a fixed division is used to determine E and F. For example, 60% of the fingers may be allocated as probing fingers, while the rest are allocated as combining fingers. Note that there must be at least as many probing fingers as combining fingers, since the probing finger provides the channel estimate needed for Rake combining.

Alternatively, the partitioning may be adaptive. For example, one can pretend to use the user-first approach. Once completed, one can count how many probing fingers were created and use this for E. (The assignment of the probing fingers to paths can also be kept.) When a new user enters the system, or the number of paths per user changes, the value of E can be recomputed.

Probing Finger Allocation

The present invention also divides probing finger resources among the different users. In one embodiment, a fixed allocation is utilized. For example, E/max(K) probing fingers are assigned to a new user, where max(K) is the maximum number of users allowed. E/K probing fingers may also be utilized, where K is the actual number of user signals (or separate code channels) present. Probing fingers may also be assigned unevenly between users, using one or a combination of the following criteria:

- delay spread: more fingers to users with more paths;
- channel speed: more fingers to high speed users as the channel changes rapidly over time;
- data rate: more fingers to users with higher data rates to allow them to have the required quality of service to maintain that rate;
- priority of service: more fingers to users with higher priority services; and
- average power: more fingers to users with low power (an inverse water-filling type approach).

Alternatively, probing fingers may be adaptively allocated across users by considering the load of the system. Initially, when the system is lightly loaded, there are enough resources to simply assign probing fingers to all paths of a new user. Thus, for lightly loaded systems, this strategy would improve range and reduce interference introduced into other cells. However, at some point, the resources will be fully utilized, and probing fingers will need to be taken from existing users to accommodate a new user.

For example, if delay spread is used to allocate probing fingers, every user may initially be allocated one probing finger corresponding to its strongest path (on average). Then, the remaining probing fingers may be assigned one at a time based on the cumulative fraction of average path energy collected. Each finger is given to the user who has collected the least amount of average path energy so far. Average path energy is determined from the searcher path strengths, for which fading has usually been averaged out. If the user-first approach is used to determine E, the same approach can be used to determine probing finger allocation.

Combining Finger Allocation

First, there are several approaches for allocating combining finger resources to different users. In the uplink, power control is used, and there is an interaction between how fingers are allocated and power control. The more combining fingers allocated to a given user, the more existing energy is collected, reducing the need to command the user to transmit more power.

Another reasonable criterion for combining finger allocation is the minimization of total receiver power at the base station. A common admission control strategy is to limit the total receiver power. Thus, minimizing this power maximizes capacity. At the same time, the SIR requirements of each user must be met. Using index i to denote a user, it is convenient to define the following quantities:

$p_i$ is the total multipath power received for user i;
N is the noise floor (other-cell interference+thermal noise);
$s_i$ is the required SIR after Rake combining for user i;
$L_i$ is the spreading factor for user i;
$\phi_i$ is the number of paths for user i;
$f_i$ is the number of combining fingers allocated to user i;
F is the total number of combining fingers available;
$a_i$ is the fraction of multipath energy collected for user i using the $f_i$ fingers;
$g_i = s_i/L_i$, the required SIR "per chip";
$h_i = g_i/(g_i + a_i)$, a useful quantity referred to as the allocation ratio; and
K is the total number of users.

We can express the SIR for user i as:

$$s_i = \frac{(a_i)(p_i)}{(1/L_i)\left[N + \sum_{m=1, m \neq i}^{K} p_m\right]}. \tag{D-1}$$

When this requirement is met for all users, then the total received power (normalized by N, the noise floor) is given by:

$$\tilde{P}_R = (P_R)/N = \frac{\sum_{m=1}^{K} h_m}{1 - \sum_{m=1}^{K} h_m}. \tag{D-2}$$

It can be seen from (D-2) that to minimize the total receive power, the values for $h_m$ must be controlled. These values depend on $g_m$ and $a_m$. The $g_m$ terms are a function for the required SIR and spreading factor. If the radio access bearer (RAB) has already been determined for that user, then these quantities are fixed. As described below, rate adaptation may be performed wherein these quantities are controlled as part of finger allocation. However, $a_m$ can be controlled, which is the fraction of energy collected for user m. This depends on the fading situation and the combining fingers assigned to user m.

Figure 5:
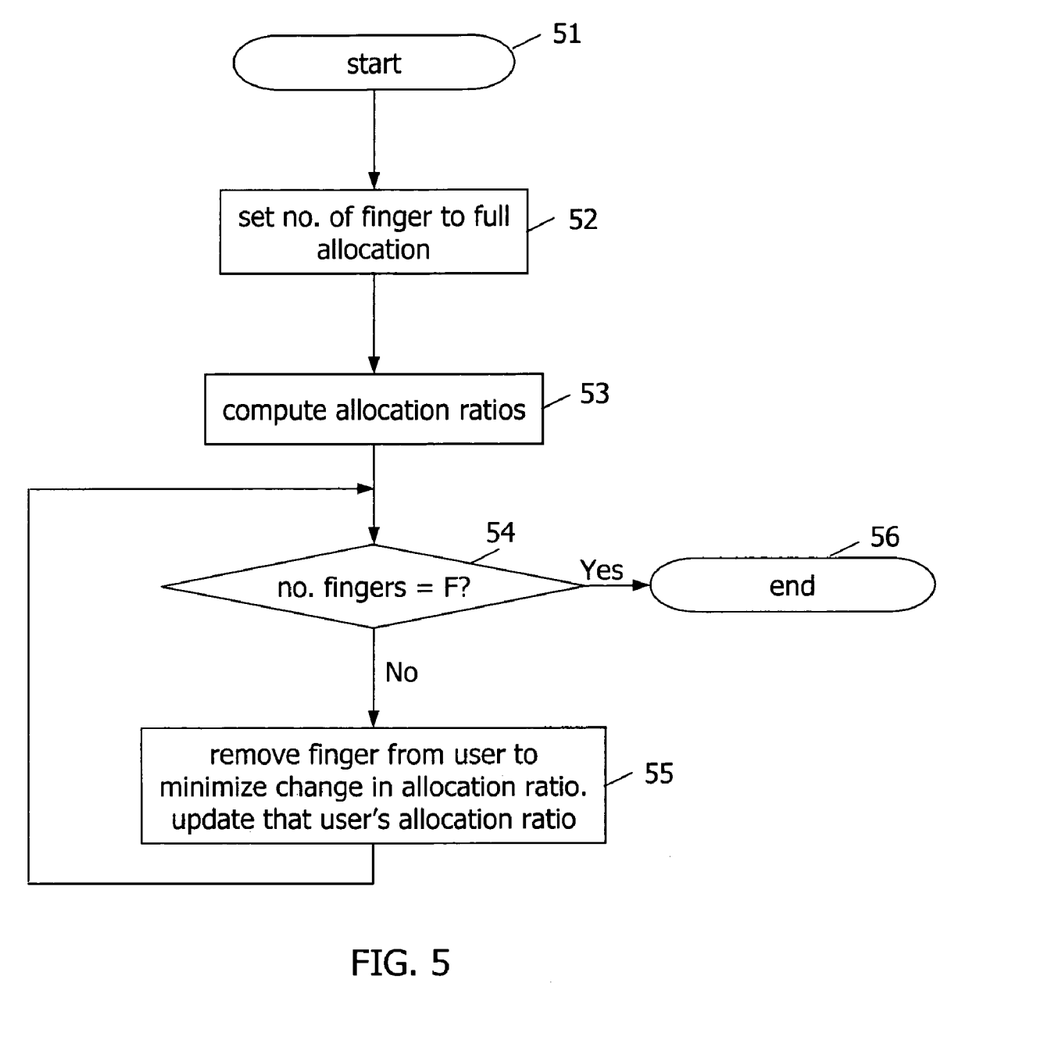
FIG. 5 is a flow chart illustrating the steps of a Delta approach for allocating combining fingers from a pool of F combining fingers.

FIG. 5 is a flow chart illustrating the steps of a Delta approach for allocating combining fingers from a pool of F combining fingers. User i has $\phi_i$ paths which have been ordered in decreasing instantaneous power, i.e., $$R_i(1) \geq R_i(2) \geq \ldots R_i(\phi_i),$$

where $R_i(m)$ is the instantaneous power in path m for user i. In practice these are estimated by the path power unit 46. These instantaneous powers have been normalized by their total so that they sum to 1. Thus, the fraction of power collected is $$a_i = \sum_{m=1}^{f_i} R_i(m).$$

It is desired to allocate fingers to K users from a pool of F fingers, minimizing the normalized total receive power. The process starts at step 51, and at step 52, the process for allocating fingers preliminarily considers allocating enough fingers to each user to cover all the paths, i.e. $f_i=\phi_i$. This corresponds to a total number of fingers of $$F_{full} = \sum_{i=1}^{K} \phi_i,$$

which is assumed to be greater than F. If not, then fingers are simply assigned to all paths.

At step 53, allocation ratios are calculated. The total receive power initially can be computed using equation (D-2), which can be expressed as a numerator divided by a denominator:

$$\tilde{P}_R(0) = \frac{NUM(0)}{DENOM(0)}.$$

At step 54, it is determined whether the number of fingers is equal to F. If not, the process moves to step 55 where fingers are taken away, one at a time, until F fingers remain, which is the actual total number of fingers available. At that point, the process ends at step 56. At each iteration, the increase in total receive power is minimized. Thus, at iteration 1, we consider taking one finger from user 1 or one finger from user 2 and so on. If a finger is taken from user i, the new total receive power is:

$$\tilde{P}_R(1) = \frac{NUM(0)+d_i(1)}{DENOM(0)-d_i(1)},$$

where $d_i(1)=h_i(1)-h_i(0)$ is the change in the allocation ratio due to the removal of a finger. Note, when removing a finger, the finger assigned to the weakest path is removed.

It can also be attempted to remove a finger separately for each user with 2 or more fingers, and then determine which case minimizes this new total received power. (Each user needs at least one finger to collect some signal energy.) It turns out that this is equivalent to determining the change in allocation ratio for each user and identifying the user with the smallest change in allocation ratio. Once it is identified which user to take a finger from, then the allocation ratio can be updated for that user.

The process is then repeated, stealing a second finger from one of the K users. The search ends at the step in which F fingers have been allocated. This approach is called the "Delta" approach because it minimizes the change (increase) in total receive power as fingers are removed.

Certain derivative approaches may also be utilized to allocate combining fingers. Consider again user i with $\phi_i$ discrete paths $R_i(m)$ ordered in decreasing normalized instantaneous power. Applicant has found that the allocation of a finger to the m-th path changes the total received power according to the difference equation:

$$\Delta \tilde{P}_i = \frac{1}{\left(1-\sum_{k=1}^{K} h_k\right)^2} \times \frac{-g_i}{(g_i+a_i)^2} \times R_i(m) \quad (1)$$

This equation can be used in an efficient search for a good finger allocation. Note that the term $R_i(m)$ represents the derivative of $a_i$ with respect to the finger allocation.

Figure 6:
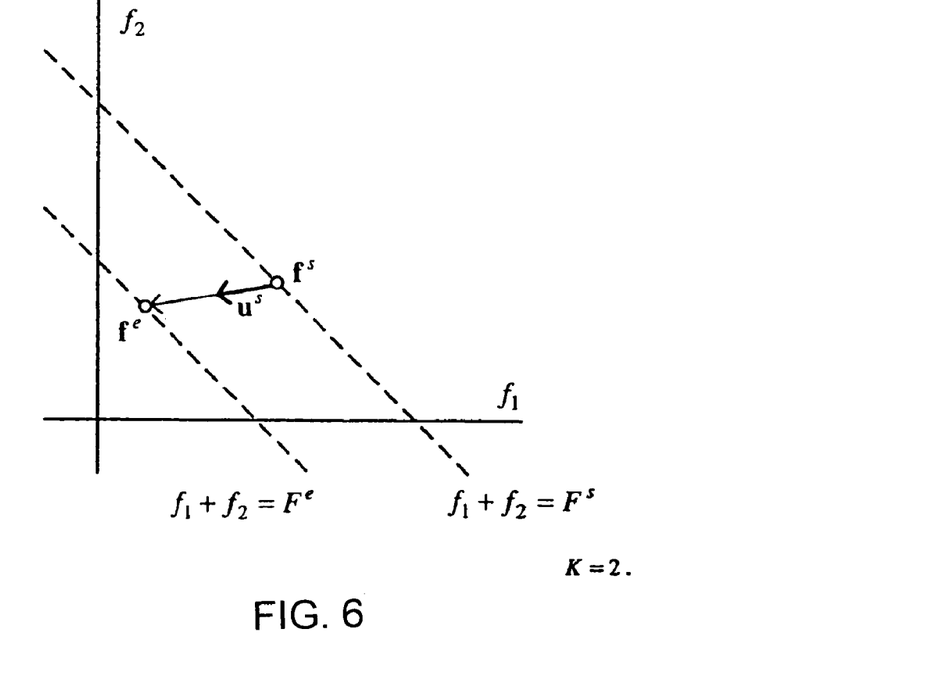
FIG. 6 is a graphical representation of a single-step steepest descent approach for allocating combining fingers.

FIG. 6 is a graphical representation of a single-step steepest descent approach for allocating combining fingers. The process may start from a certain finger allocation $f^s=(f_1^s, \ldots, f_K^s)$ with corresponding total $F^s$. It is desired to find another finger allocation $f^e=(f_1^e, \ldots, f_K^e)$ whose total satisfies a target total $F^e$. This approach uses a steepest descent search that starts in $f^s$ and ends in $f^e$. The objective is to reach a good allocation $f^e$, regardless of whether or not the starting point $f^s$ is a good allocation. By good allocation, it is meant that the allocation is close to the optimal allocation for the given value $F^e$. In general, it is not possible to derive a closed form, but it is possible to exploit the above difference equation in an efficient search. In two embodiments, the present invention utilizes a steepest descent search and a projection search variant that exploit the difference equation and provide practical search mechanisms.

First, consider the case where $F^e \neq F^s$. The case $F^e=F^s$ is treated differently. One possible choice for $F^s$ is $$F^s = \sum_{m=1}^{K} \phi_m,$$

with corresponding $f^s=(\phi_1, \ldots, \phi_K)$, i.e., full allocation to collect all signal energy. Other choices for $F^s$ and $f^s$ are discussed below.

In its simplest form, the steepest descent search consists of a single step. First we evaluate the vector $u^s=(u_1^s, \ldots, u_K^s)$ of differences according to (1) at the starting point $f^s$, that is:

$$u_i^s = \Delta \tilde{P}_i|_{f^s} \quad (2)$$

The vector $u^s$ determines the direction of steepest descent at $f^s$. The line passing through $f^s$ in the direction of $u^s$ is determined by the set of equations:

$$f_i = u_i^s \times v + f_i^s, \quad (3)$$

for all i. The variable v is determined by incorporating the constraint:

$$\sum_{m=1}^{K} f_m^e = F^e \quad (4)$$

into (3). The end allocation $f^e$ is given by:

$$f_i^e = u_i^s \times \frac{F^e - F^s}{\sum_{m=1}^{K} u_m^s} + f_i^s. \quad (5)$$

This result is expected to be good if $F^e$ is close to $F^s$ and $f^s$ is a good starting solution.

Figure 7:
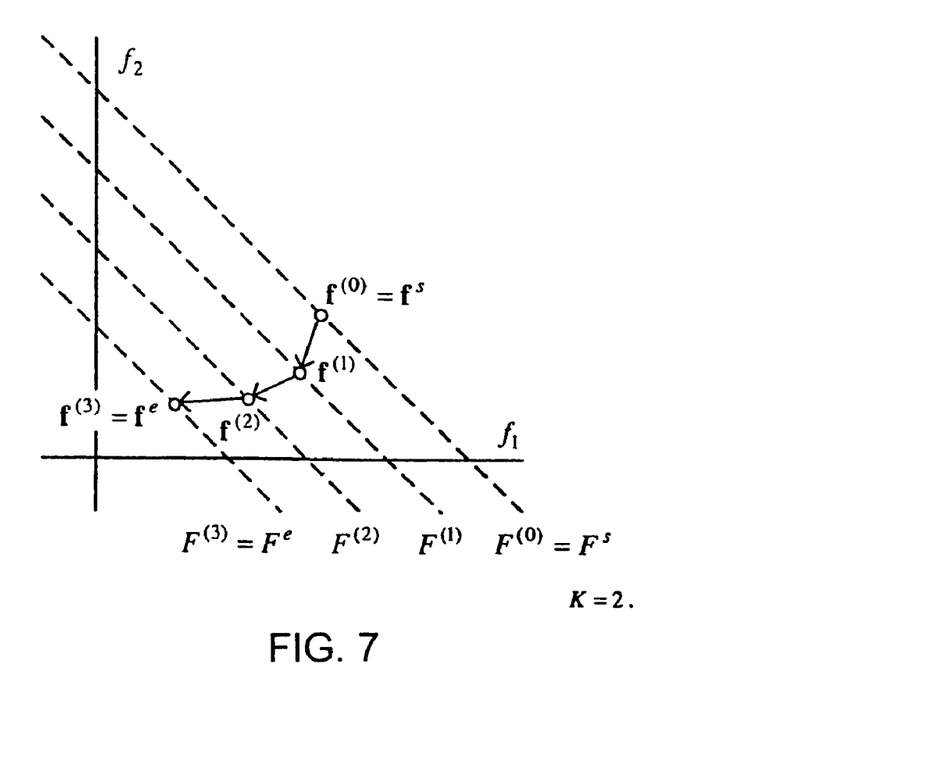
FIG. 7 is a graphical representation of a multiple-step steepest descent approach for allocating combining fingers.

FIG. 7 is a graphical representation of a multiple-step steepest descent approach for allocating combining fingers. It is straightforward to generalize the single-step method to include multiple steps. That is, for some choice W for the number of steps, we define the increment:

$$\Delta F = \frac{F^e - F^s}{W} \quad (6)$$

and the steepest descent method is applied W times. The first step uses the vector of derivatives $u^{(0)}=u^s$ evaluated at $f^{(0)}=f^s$ to determine a first intermediate solution $f^{(1)}$ whose total is $F^{(1)}=F^s+\Delta F$. The second step uses the vector of derivatives $u^{(1)}$ evaluated at $f^{(1)}$ to determine a second intermediate solution $f^{(2)}$ whose total is $F^{(2)}=F^s+2\Delta F$, and so on. At Step I, the intermediate solution $f^{(I)}$ is found using a set of equations similar to (5):

$$f_i^{(l)} = u_i^{(l-1)} \times \frac{\Delta F}{\sum_{m=1}^{K} u_m^{(l-1)}} + f_i^{(l-1)}. \qquad (7)$$

The solution $f^{(W)}$ after W steps has a total $F^{(W)}=F^s+W\times\Delta F=F^e$. The term $f^{(W)}$ is used as the final solution $f^e$.

Figure 8:
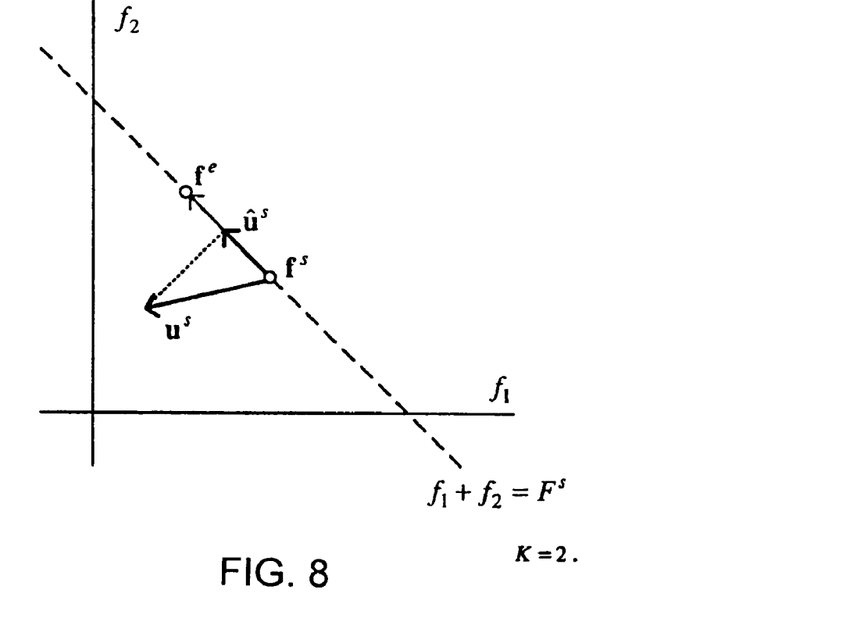
FIG. 8 is a graphical representation of a single-step projection search approach for allocating combining fingers.

FIG. 8 is a graphical representation of a single-step projection search approach for allocating combining fingers. Again, consider a scenario starting from a certain finger allocation $f^s=(f_1^s,\ldots,f_K^s)$ with corresponding total $F^s$. However, in this approach it is desired to reach a good finger allocation $f^e=(f_1^e,\ldots,f_K^e)$ whose total $F^e=F^s$. The steepest descent vector $u^s$ does not necessarily lie in the (K−1) dimensional space determined by:

$$\sum_{m=1}^{K} f_m = F^s. \qquad (8)$$

In order to keep the end solution $f^e$ in the same space, the steepest descent vector must be modified by projecting it onto that space. To do so, the component of $u^s$ along the axis perpendicular to the space is removed. As a result, the projection vector $\hat{u}^s$ is given by:

$$\hat{u}_i^s = u_i^s - \frac{1}{K}\sum_{m=1}^{K} u_m^s. \qquad (9)$$

A search step must be defined, and two variants are described, a fixed scaling variant and a fixed step size variant. In the fixed scaling variant, the step size is considered to be implicit in $\hat{u}^s$. That is, if $\|\hat{u}^s\|$ is large, then it is an indication that a big step is needed, whereas a small step is required if $\|\hat{u}^s\|$ is small. The term $\hat{u}^s$ can be scaled by a factor $\rho$. Then the single step version is simply given by:

$$f^e = f^s + \rho \times \hat{u}^s. \qquad (10)$$

In the fixed step size variant, a fixed step size $\Delta$ is utilized, ignoring the variation in $\|\hat{u}^s\|$. Then:

$$f^e = f^s + \Delta \times \frac{\hat{u}^s}{\|\hat{u}^s\|}. \qquad (11)$$

Figure 9:
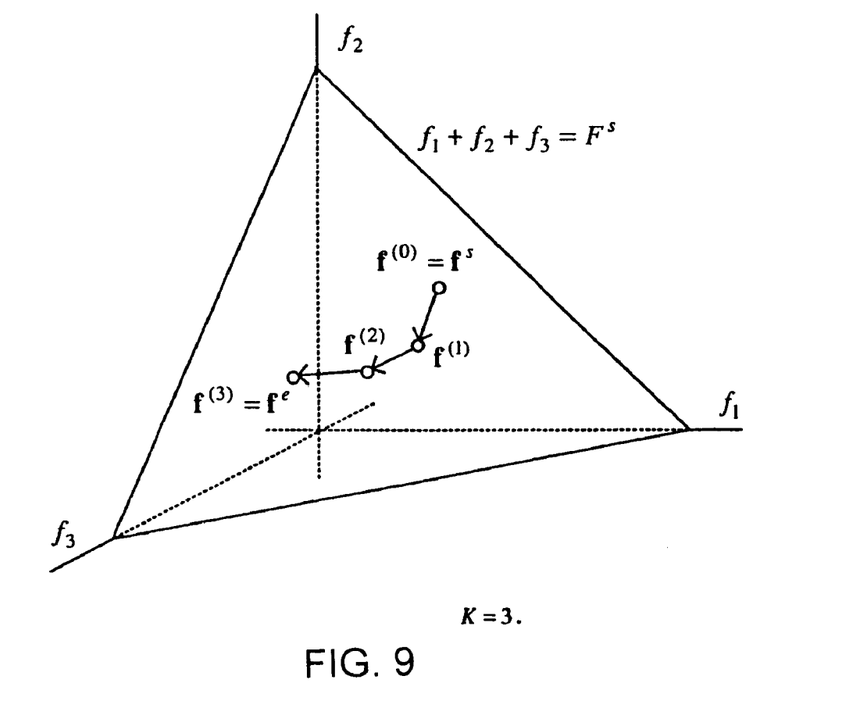
FIG. 9 is a graphical representation of a multiple-step projection search approach for allocating combining fingers.

FIG. 9 is a graphical representation of a multiple-step projection search approach for allocating combining fingers. A simple extension to a multiple-step search uses the projection vector $\hat{u}^s$, without updates at intermediate steps, and a small scaling $\rho$, as in (10). Let w denote the number of steps, then Step I is given by:

$$f^{(I)}=f^s+I\times\rho\times\hat{u}^s \qquad (11)$$

For each vector $f^{(I)}$, the corresponding total normalized power $\tilde{P}$ is computed, and the vector that yields the smallest $\tilde{P}$ is selected as the end solution $f^e$. Alternatively, we can also use $\hat{u}^s$, without updates at intermediate steps, and a small step size $\Delta$, as in 0. The rest of the search is the same.

A more sophisticated search updates the projection vector at intermediate steps. At Step (I-1), the projection vector $\hat{u}^{(I-1)}$ is derived from the vector of derivatives $u^{(I-1)}$ evaluated at the previous intermediate solution $f^{(I-1)}$, similarly to (9):

$$\hat{u}_i^{(I-1)} = u_i^{(I-1)} - \frac{1}{K}\sum_{m=1}^{K} u_m^{(I-1)}. \qquad (12)$$

The multiple-step search can now proceed using either the fixed scaling or the fixed step size. With the fixed scaling, the intermediate vector at Step I is given by:

$$f^{(I)}=f^{(I-1)}+\rho\times\hat{u}^{(I-1)}. \qquad (13)$$

Note that updating the projection vector allows the search to effectively slow when the solution is close to optimal.

It is always helpful in search method to use a good starting solution $f^s$, at least not a bad one. One embodiment uses proportional allocation, where, given a total $F^s$, each of the K users is allocated:

$$f_i^s = \frac{F^s \phi_i}{\sum_{m=1}^{K} \phi_m}. \qquad (14)$$

This assumes that $$F^s \leq \sum_{m=1}^{K} \phi_m.$$

In another embodiment equal allocation is utilized, which shares the available fingers equally among users.

It may be useful to mix the steepest descent and projection searches in a hybrid strategy. For example, in the general case where $F^e \neq F^s$, a single or multi-step steepest descent method can first be utilized to reach an intermediate finger allocation solution with total $F^e$. The intermediate solution can then be improved by using it as the starting point of a single or multiple-step projection method. Another embodiment alternates one steepest descent step with one projection step. Other alternative hybrid strategies can also be utilized.

The Applicant's model allows for continuous allocations, which is convenient for analysis. Of course, in practice, integer allocations must be utilized at any given time. The straightforward approach is to round a non-integer solution to obtain an integer allocation. The quantization effect should only be a concern if the allocation is very small, for example under 5 fingers.

Another approach is to interpret a non-integer allocation as a time average between integer allocations. That is, an allocation of 5.25 can be achieved by using 5 fingers for three quarters of the time period of interest and 6 fingers for one quarter. This interpretation may be further validated if the symbols are part of the same codeword, then the decoder would be able to benefit from such a scheme.

An alternative to using the discrete channel paths $R_i(m)$ directly is to use a continuous channel model $R_i(t)$, where t is a continuous variable. Then the relation between $R_i(t)$, $a_i$ and $f_i$ is given by:

$$\alpha_i = \int_0^{f_i} R_i(t)dt \tag{15}$$

The advantage of modeling is to simplify certain aspects of the search, eliminating it completely in one case. The disadvantage is that model fitting introduces error.

In a derivative approach, instead of the difference equation, the derivative of the total received power with respect to the finger allocation is used in the continuous model, which is given, for all i, by:

$$\frac{\partial \tilde{P}}{\partial f_i} = \frac{1}{\left(1 - \sum_{k=1}^{K} h_k\right)^2} \times \frac{-g_i}{(g_i + a_i)^2} \times R_i(t) \tag{16}$$

Figure 10:
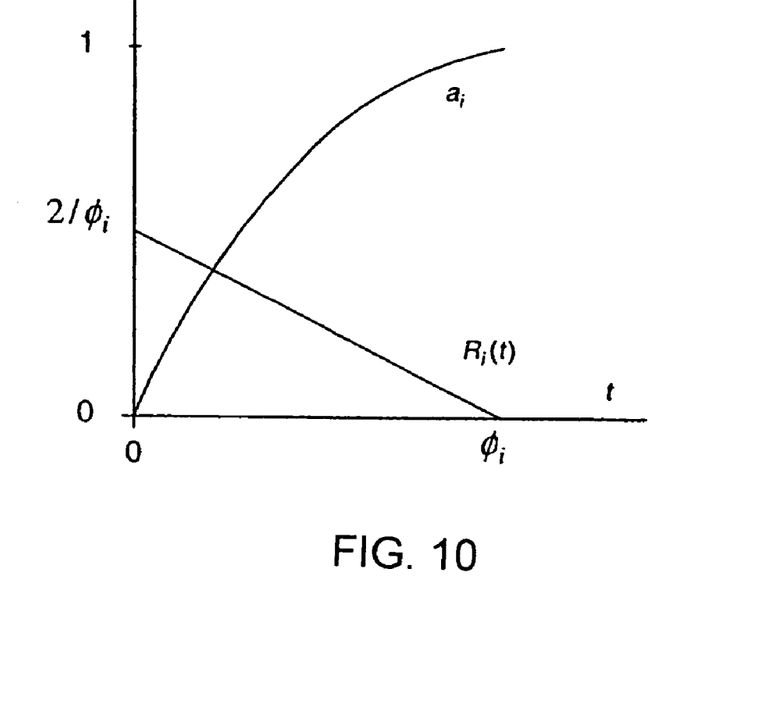
FIG. 10 is a graphical representation of a linear decay profile model.

FIG. 10 is a graphical representation of a linear decay profile model given by:

$$R_i(t) = \frac{2}{\phi_i} - \frac{2t}{\phi_i^2}, \tag{17}$$

for $0 \le t < \phi_i$, and $$a_i = \frac{2f_i}{\phi_i} - \frac{f_i^2}{\phi_i^2}, \tag{18}$$

for $0 < f_i \le \phi_i$. The parameter $\phi_i$ is adapted to fit the inputs $R_i(m)$. Other models may also be used, such as exponential delay.

Figure 11:
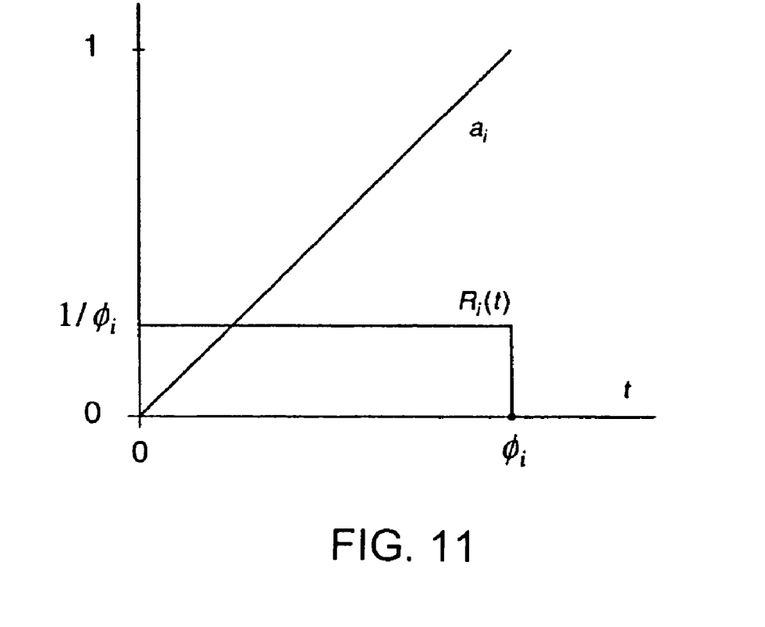
FIG. 11 is a graphical representation of a flat profile model.

FIG. 11 is a graphical representation of a flat profile model given by:

$$R_i(t) = \frac{1}{\phi_i}, \tag{19}$$

for $0 \le t < \phi_i$, and $$a_i = \frac{f_i}{\phi_i}, \tag{20}$$

for $0 \le f_i < \phi_i$. The flat model enables the derivation of a closed form solution for the optimal finger allocation. That is, if F is the target finger total, then the allocation is given by:

$$f_i = cg_i^{1/2}\phi_i^{1/2} - g_i\phi_i \tag{21}$$

where:

$$c = \frac{F + \sum_{m=1}^{K} g_m \phi_m}{\sum_{m=1}^{K} g_m^{1/2} \phi_m^{1/2}}. \tag{22}$$

We can also write:

$$\tilde{p}_i = \frac{g_i^{1/2}\phi_i^{1/2}}{c - \sum_{m=1}^{K} g_m^{1/2}\phi_m^{1/2}}, \tag{23}$$

and:

$$\tilde{P} = \frac{\sum_{m=1}^{K} g_m^{1/2}\phi_m^{1/2}}{c - \sum_{m=1}^{K} g_m^{1/2}\phi_m^{1/2}}. \tag{24}$$

It is possible that the optimal finger allocation will violate the maximum finger boundaries. Specifically, for a given value of the constraint, F, the optimal allocation $f_i$ for all i may be found according to (21). If $f_i > \phi_i$ for some i, then those values need to be set to $f_i = \phi_i$, and the optimization problem should be solved again. Without loss of generality, suppose that for K'<K, the values $i \le K'$ satisfy the boundaries, and stay in the optimization set, while the values i>K' violate them and are left out of the optimization set. Then we set $f_i = \phi_i$ for i>K', and define a new constraint:

$$F' = F - \sum_{m=K'+1}^{K} \phi_m, \tag{25}$$

Thereafter, the optimization problem for $i \le K'$ is solved using F'. If the new solution violates the boundaries, then the same steps are repeated, leaving more users out of the optimization set. Eventually, all users will satisfy $f_i \le \phi_i$.

A second situation, where a user is left out of the optimization set, occurs when users are forced to have a certain number of fingers, and the other users are optimized. That is, for some K'<K, and some desired values $\bar{f}_i \le \phi_i$ we set $f_i = \bar{f}_i$ for i>K', and those users are left out of the optimization set. We also modify the constraint:

$$F' = F - \sum_{m=K'+1}^{K} \bar{f}_m. \tag{26}$$

The optimization is started as before, with $i \le K'$ and F'. Again, if the solution violates the finger boundaries, the corresponding users are left out of the optimization set, and so on.

So far, we have tried to minimize the total receive power at the base station that demodulates the users. However, other criteria may be utilized. One criterion is to minimize the sum of the transmit powers of the users being demodulated. Let $w_i$ denote the propagation loss of the channel, such that the transmitted power $q_i$ is given by $q_i = w_i p_i$. Then the total transmit power is given by:

$$\tilde{P}_T = (P_T)/N = \frac{\sum_{m=1}^{K} w_m h_m}{1 - \sum_{m=1}^{K} h_m}. \tag{D-3}$$

The delta approach can be modified slightly to minimize transmit power instead. When considering removing one finger, one would compute:

$$\tilde{P}_T(1) = \frac{NUM(0) + w_i d_i(1)}{DENOM(0) - d_i(1)}$$

and try to minimize it. The propagation losses would need to be estimated by the base station from the received signal. This can be done by keeping track of the initial power used and the effects of the power control commands. Ultimately, only the relative propagation losses are needed.

Another criterion would be the total receive power summed over all base stations, thus accounting for how the user is interfering with other cells. This can be done by having base stations measure power levels of users and passing that information on to a serving base station or central network node.

Yet another criterion is grade-of-service. For example, certain users may have priority due to a negotiated service agreement or the nature of the transaction (such as an emergency 911 call). In this case, full finger assignment may be used for them prior to allocation among the remaining users. Also, if a certain user is on the edge of the cell, more fingers may be given to that user initially prior to allocation among the remaining users.

Another way to help users on the edge of the cell is to use (D-3) and redefine $w_i$ as a weighting parameter. Making this large for certain users will ensure that they are assigned more fingers. One can iteratively adapt these weights until certain users no longer hit their transmit power limits. One would increase the weights for users who would have to transmit too much power.

Power Allocation

With fast combining finger allocation, the approaches allocating combining fingers also determine the received power needed for each user. This information can be used elsewhere in the base station to command the mobile user to increase or decrease its power. One approach is to compute the new receive powers of the users using:

$$\tilde{p}_i = (p_i)/N = \frac{h_m}{1 - \sum_{m=1}^{K} h_m}. \qquad (4)$$

This can be compared to the previous value to determine how to command the mobile to change its power. If the new power is 2×dB stronger than the old one, where x is the power control step size, then a series of 2 "up" commands are sent to the mobile unit.

If the frequency of commands is not fast enough, then it may be beneficial to redo the finger allocation, trying to keep any power changes within the range of the power control algorithm. This may be done iteratively by adjusting the original solution, giving more fingers to users whose power must increase too fast and fewer fingers to users whose power decreases too fast.

In practice, the transmitter has a limited range of transmission (a minimum and maximum power), and so transmit power limitations must be incorporated. Considering the maximum power constraint first, it is understood that the base station can detect when a mobile user is transmitting at maximum power by noticing when the mobile user consistently ignores "up" power commands. This can be done by tracking the fading channel process, predicting its value in the next power control interval, then comparing this prediction to the actual value. The ratio should reflect any response to a power control command. When this situation is detected, the user's connection can be maintained by giving that user more fingers. Thus, more fingers are taken from the pool, and the the allocation process is then applied only to the remaining users.

There is also a minimum power constraint. This can be detected in a way similar to the maximum power scenario. When detected, some fingers can be taken away from this user, then the allocation process is applied only to the remaining users.

Rate Adaptation

In another embodiment, the flexibility of rate adaptation is exploited in conjunction with finger allocation. Rate adaptation is commonly used with data services. Suppose User i is allowed to transmit at a certain bit rate. This is achieved with a certain format, defining the coding, modulation, spreading factor, number of codes, and so on. In general, the higher the bit rate, the higher the required target SNR, $s_i$, at the base station receiver. As before, the base station allocates its fingers F among the users. Now suppose that either (1) there is no valid allocation, or (2) the resulting total received power is determined to be too high. One way to resolve this problem is to ask User i to lower its rate. Doing so reduces its $s_i$, which for condition (1), improves the chances of finding a valid allocation, and for condition (2), lowers the total power. If the change in $s_i$ is significant enough, some of the fingers allocated to User i may be reallocated to other users.

It is also true that if the total number of fingers, F, is increased, then the chances of supporting a higher data rate user improves. In general, this establishes a relationship between finger allocation and achievable rates.

Advanced Receivers

When interference is non-white, performance on the link can be improved by using a generalized Rake (G-Rake) receiver. Also, high data rate users can benefit from using a G-Rake receiver to perform equalization. A G-Rake receiver often benefits in performance from using more finger resources. Thus, by determining which users could benefit the most from using a G-Rake receiver, and allowing them to use more finger resources, performance of all users can be improved. Additionally, fingers can be assigned unevenly between users based on, for example, data rate (i.e., more fingers to users with higher data rates) to allow them to use a G-Rake receiver. The SIR requirement could be a function of the number of fingers when a G-Rake receiver is used. Alternatively, SIR can be computed differently for G-Rake reception.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A radio receiver comprising:
   a front end processor that converts received radio signals to baseband samples;
   a pool of correlators; and
   a controller comprising:
   means for partitioning the correlators into a set of combining correlators and a set of probing correlators that de-spread the baseband samples; and an allocation unit that allocates probing correlators from the set of probing correlators across a plurality of different user signals to de-spread the received user signals, and allocates combining correlators from the set of combining correlators to achieve performance goals for each signal;

wherein the allocation unit allocates combining correlators from the set of combining correlators across user signals so as to minimize the total received power.

2. A radio receiver comprising:

a front end processor that converts received radio signals to baseband samples;

a pool of correlators; and a controller comprising:
   means for partitioning the correlators into a set of combining correlators and a set of probing correlators that de-spread the baseband samples;
   an allocation unit that allocates probing correlators from the set of probing correlators across a plurality of different user signals to de-spread the received user signals, and allocates combining correlators from the set of combining correlators to achieve performance goals for each signal;
   a searcher that provides the allocation unit with path delays and average path strengths for each user;
   a channel estimator that receives de-spread baseband samples from the probing correlators and produces channel estimates for each path; and
   a path power unit that receives the channel estimates for each path and provides the allocation unit with an instantaneous path power estimate for each path;
   wherein the allocation unit allocates the probing correlators based on the average path strengths received from the searcher, and allocates combining correlators based on the instantaneous path power estimates received from the path power unit.

3. A method of allocating correlators in a Direct-Sequence Code Division Multiple Access (DS-CDMA) receiver having a number of correlators for processing signal paths of a number of users, said method comprising the steps of:
   partitioning the correlators into a set of probing correlators and a set of combining correlators;
   determining an initial correlator allocation;
   calculating an allocation ratio for each user of the number of users based on the initial correlator allocation, said allocation ratio for each user depending on a signal-to-interference ratio (SIR) value and a fraction of the power collected;
   selecting at least one user based on the allocation ratio; and
   for the at least one selected user, computing a new correlator allocation and a new allocation ratio.

4. The method of claim 3, further comprising repeating the selecting and computing steps until the correlator allocation utilizes a predefined number of correlators in the receiver.

5. A method of allocating correlators in a Direct-Sequence Code Division Multiple Access (DS-CDMA) receiver having a set of correlators for processing signal paths of a number of users, said method comprising the steps of:
   a) dividing the set of correlators into a first subset of probing correlators and a second subset of combining correlators, wherein the number of probing correlators is greater than the number of combining correlators;
   b) dividing the first subset of probing correlators among the users, wherein the first subset of probing correlators is allocated to the users based on at least one of the following criteria:
      delay spread;
      channel speed;
      data rate;
      priority of service; and
      average power; and
   c) dividing the second subset of combining correlators among the users.

6. The method of claim 5, wherein step a) is repeated at a first rate, step b) is repeated at a second rate, and step c) is repeated at a third rate.

7. The method of claim 6, wherein the first rate is the rate users appear and disappear, the second rate is the rate at which paths appear and disappear, and the third rate is the rate fading channel coefficients change.

8. The method of claim 5, wherein step b) includes allocating the probing correlators to the strongest average paths for each user.

9. The method of claim 5, wherein step b) includes reallocating the probing correlators to the users when network loading conditions limit the number of probing correlators available to new users.

10. The method of claim 5, wherein step c) includes dividing the second subset of combining correlators among the users so as to minimize total received power at the receiver.

11. The method of claim 5, wherein step c) includes the steps of:
   determining an initial correlator allocation;
   calculating an allocation ratio for each user based on the initial correlator allocation, said allocation ratio depending on a signal-to-interference ratio (SIR) value and a fraction of the power collected;
   selecting at least one user based on the allocation ratio; and
   for the at least one selected user, computing a new correlator allocation and a new allocation ratio.

12. The method of claim 5, wherein step c) includes dividing the second subset of combining correlators among the users so as to minimize the sum of the transmit powers of the users being demodulated.

13. The method of claim 5, wherein step c) includes allocating a combining correlator to all paths of a high priority user before dividing the remaining combining correlators among the other users.

14. The method of claim 5, wherein step c) includes allocating a combining correlator to all paths of a user on an edge of a cell before dividing the remaining combining correlators among the other users.

15. The method of claim 5, wherein step c) includes allocating a greater number of combining correlators to users on an edge of a cell than are allocated to other users.

16. The method of claim 5, wherein step c) includes allocating a greater number of combining correlators to users transmitting at maximum power.

17. The method of claim 16, wherein the step of allocating a greater number of combining correlators to users transmitting at maximum power includes determining that a user is transmitting at maximum power by detecting that the user has ignored at least one command to increase transmit power.

18. The method of claim 5, wherein step c) includes allocating a lesser number of combining correlators to users transmitting at minimum power.

19. The method of claim 18, wherein the step of allocating a lesser number of combining correlators to users transmitting at minimum power includes determining that a user is transmitting at minimum power by detecting that the user has ignored at least one command to decrease transmit power.

20. The method of claim 5, wherein step c) includes the steps of:
- dividing the second subset of combining correlators among the users so as to minimize total received power at the receiver;
- determining that the total received power is too high;
- requesting at least one user to lower its transmitted bit rate; and
- reducing the number of combining correlators allocated to the at least one user.

21. A controller in a Direct-Sequence Code Division Multiple Access (DS-CDMA) radio receiver, comprising:
- means for receiving baseband samples from a front end processor;
- means for analyzing the baseband samples to estimate path delays;
- means for partitioning a pool of correlators into a set of probing correlators that de-spread the baseband samples, and a set of combining correlators;
- means for adaptively allocating probing correlators across a plurality of different user signals based on the estimated path delays; and
- means for adaptively allocating combining correlators to the received user signals to achieve performance goals for each signal.

22. The controller of claim 21, further comprising:
- means for analyzing the baseband samples to estimate average path strengths for each user;
- wherein the means for adaptively allocating probing correlators also adaptively allocates the probing correlators based on the average path strengths.

23. The controller of claim 22, further comprising:
- means for determining channel estimates; and
- means for estimating instantaneous path power for each signal path;
- wherein the means for adaptively allocating combining correlators to signal paths adaptively allocates the combining correlators based on the estimated path power.

24. A method of allocating correlators in a Direct-Sequence Code Division Multiple Access (DS-CDMA) receiver having a set of correlators for processing signal paths of a number of users, said method comprising the steps of:
- a) dividing the set of correlators into a first subset of probing correlators and a second subset of combining correlators, wherein the number of probing correlators is greater than the number of combining correlators;
- b) dividing the first subset of probing correlators among the users; and
- c) dividing the second subset of combining correlators among the users, wherein step c) includes the steps of:
  - computing an initial combining finger allocation;
  - utilizing a steepest descent optimization technique to compute a direction of descent by computing differences of receive power when changing the initial combining finger allocation; and
  - computing a second combining finger allocation using the initial combining finger allocation and the computed direction of descent.

25. The method of claim 24, further comprising the steps of:
- computing a second direction of descent using the second combining finger allocation; and
- computing a third combining finger allocation using the second combining finger allocation and the second direction of descent.

26. The method of claim 24, wherein the step of computing a second combining finger allocation using the initial combining finger allocation and the direction of descent includes projecting the direction of descent so that the sum of combining fingers allocated equals a specified total number of combining fingers.

* * * * *